United States Patent
Aleiner et al.

(10) Patent No.: US 6,484,015 B1
(45) Date of Patent: Nov. 19, 2002

(54) PORTABLE TELEPHONE ANTENNA

(75) Inventors: Elizabeth Aleiner, Somerset, NJ (US); Ilya A. Korisch, Eatontown, NJ (US); Yoshinao Nakada, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/958,455

(22) Filed: Oct. 27, 1997

(51) Int. Cl.[7] ................................................. H04B 7/02
(52) U.S. Cl. ........................ 455/90; 455/101; 455/272; 343/702
(58) Field of Search ............................ 455/6.1, 90, 424, 455/425, 19, 25, 82, 97, 121, 193.1, 269, 275, 279.1, 101, 272, 277.1; 343/700, 702

(56) References Cited

U.S. PATENT DOCUMENTS

| | | | | |
|---|---|---|---|---|
| 5,093,670 A | * | 3/1992 | Braathen | 343/792.5 |
| 5,303,240 A | * | 4/1994 | Borras et al. | 455/277.1 |
| 5,335,366 A | * | 8/1994 | Daniels | 455/89 |
| 5,541,609 A |   | 6/1996 | Stutzman et al. | |
| 5,734,716 A | * | 3/1998 | Kulberg | 379/433 |
| 5,752,204 A | * | 5/1998 | Epperson et al. | 455/575 |
| 6,011,515 A | * | 1/2000 | Radcliffe et al. | 342/453 |

FOREIGN PATENT DOCUMENTS

JP    40-7170222 A  *  4/1995 ............ H04B/7/26

* cited by examiner

*Primary Examiner*—Lee Nguyen
(74) *Attorney, Agent, or Firm*—Lucent Technologies Inc.

(57) ABSTRACT

A portable telephone which includes a directional antenna is provided. The directional antenna is designed such that it can be positioned for use so that its beam is substantially parallel to the direction of received electromagnetic energy, thereby increasing the efficiency at which electromagnetic energy is transmitted to and received from the base station(s) as well as reducing the levels of electromagnetic energy transmitted into the body of the portable telephone user. In another embodiment, two directional antennas are provided for use with a diversity receiver and can be positioned for use to provide directional diversity, space diversity or both, thereby providing added immunity against fading.

20 Claims, 2 Drawing Sheets

PORTABLE TELEPHONE ANTENNA

BACKGROUND OF THE INVENTION

This invention relates to antennae for portable telephones.

Because of their ever-decreasing cost, portable telephones are on the way to becoming widely used by large segments of the population. Also, along with the decrease in cost of operation, existing users have significantly increased their usage. Thus, ever larger segments of the population are making more and longer telephone calls using portable telephones.

Most portable telephones in use today operate using at least one of the following transmission technologies: TDMA (time division multiple access) GSM (Global System for Mobile Communications), CDMA (code division multiple access), PCS (personal communications service) or analog. Commonly used with all of these transmission technologies, however, are non-directional helical or monopole type antennas. Such non-directional antennas are characterized by the fact that they transmit and receive electromagnetic energy more or less equally in all directions. This has at least two disadvantages. First, such antennas are inefficient at transmitting and receiving electromagnetic energy to and from the base station(s). Second, such antennas transmit electromagnetic energy into the body of the portable telephone user, where it must be dissipated as heat, resulting in decreased power efficiency.

Fading is a problem common to most mobile communication systems. Fading occurs when, due to reflections from a plurality of base stations, the incoming waves cancel each other out. This results in a temporary loss of data and, possibly, a termination of the call.

In view of the foregoing, it would be desirable to provide a portable telephone which is efficient at transmitting and receiving electromagnetic energy to and from the base station(s).

It would also be desirable to provide a portable telephone with reduced levels of electromagnetic energy transmitted into the body of the portable telephone user.

It would be desirable to provide a portable telephone with increased immunity to fading.

SUMMARY OF THE INVENTION

It is an object of the present invention to provide a portable telephone which is efficient at transmitting and receiving electromagnetic energy to and from the base station(s).

It is also an object of the present invention to provide a portable telephone with reduced levels of electromagnetic energy transmitted into the body of the portable telephone user.

It is another object of the present invention to provide a portable telephone with increased immunity to fading.

These and other objects are accomplished by providing a portable telephone which includes a directional antenna. The directional antenna is designed such that it can be positioned for use so that its beam is substantially parallel to the direction of received electromagnetic energy (i.e., along the horizon), thereby increasing the efficiency at which electromagnetic energy is transmitted to and received from the base station(s) as well as reducing the levels of electromagnetic energy transmitted into the body of the portable telephone user.

In addition, a portable telephone with two directional antennas is provided. The two directional antennas can be positioned for use to provide directional diversity, space diversity or both, thereby providing improved diversity system performance that leads to a reduction in the effects of fading.

BRIEF DESCRIPTION OF THE DRAWINGS

The above and other objects and advantages of the invention will be apparent upon consideration of the following detailed description, taken in conjunction with the accompanying drawings, in which like characters refer to like parts throughout and in which.

DETAILED DESCRIPTION

Figure 1:
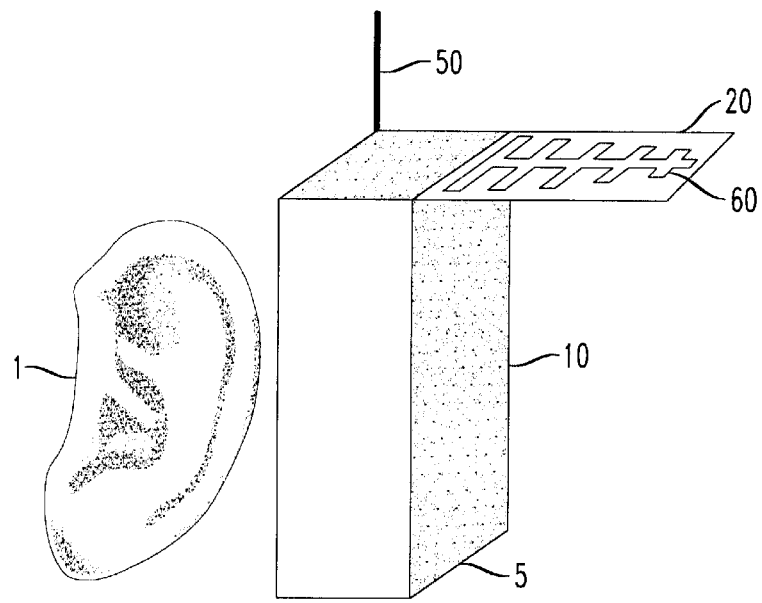
FIG. 1 represents a view of a first embodiment of a portable telephone with a directional antenna positioned in a top flip of the portable telephone and an optional monopole type antenna.

FIG. 1 shows a view of a first preferred embodiment of a portable telephone 5. The portable telephone 5 includes a directional antenna 60 positioned in a top flip 20 of the portable telephone 5 and an optional non-directional antenna 50 (here, a monopole type antenna is shown) positioned near the top of the portable telephone 5. The directional antenna may include an array of radiating elements.

The portable telephone 5 shown in FIG. 1 is shown with the top flip 20 positioned for use at approximately 90 degrees from the body 10 of the portable telephone 5. In addition, the monopole type antenna 50 is shown fully extended, although it should be noted that this antenna is optional. It should also be noted that the top flip 20 may be positioned for use at any angle from the body 10 of the portable telephone 5. However, an angle between approximately 60 degrees to 120 degrees is preferred.

Outgoing waves for transmission to the base station are ideally positioned in the same direction as incoming waves. Because the base station(s) are often at a considerable distance, they appear to be on the horizon. Ideally, the top flip 20 (hence, the directional antenna 60) is positioned for use such that the beam of the directional antenna is substantially parallel to the direction of the incoming electromagnetic waves. This provides the additional beneficial effects that the direction of the outgoing (i.e., transmitted) waves is also in the direction of the base station and away from the user's body 1, thereby reducing the amount of power required to transmit and decreasing the amount of electromagnetic energy by the user's body 1.

Figure 2:
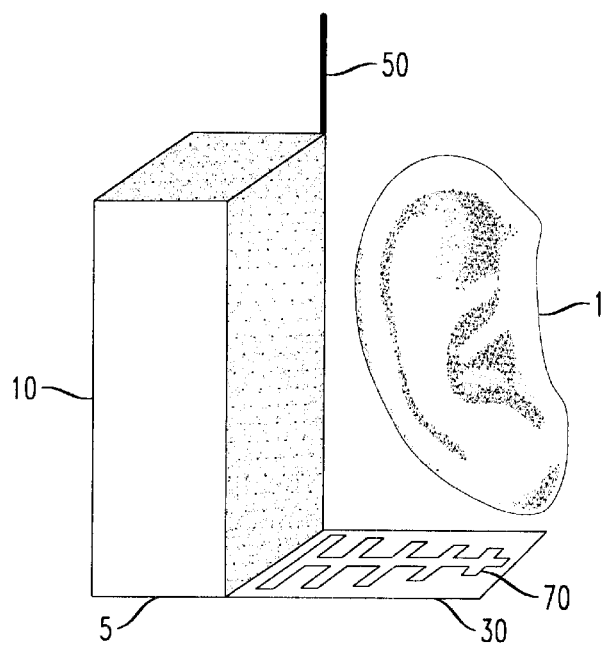
FIG. 2 represents a view of a second embodiment of a portable telephone with a directional antenna positioned in a bottom flip of the portable telephone and an optional monopole type antenna.

FIG. 2 shows a view of a second preferred embodiment of a portable telephone 5. The portable telephone 5 includes a directional antenna 70 positioned in a bottom flip 30 of the portable telephone 5 and an optional non-directional antenna 50 (here, a monopole type antenna is shown) positioned near the top of the portable telephone 5. The portable telephone 5 shown in FIG. 2 is shown with the bottom flip 30 positioned for use at approximately 90 degrees from the body 10 of the portable telephone 5. In addition, the monopole type antenna 50 is shown fully extended, although it should be noted that this antenna is optional. It should also be noted that the bottom flip 30 may be positioned for use at any angle from the body 10 of the portable telephone 5. However, an angle between approximately 60 degrees to 120 degrees is preferred.

Ideally, the bottom flip 20 (hence, the directional antenna 70) is positioned for use such that the beam of the directional antenna is substantially parallel to the direction of the incoming electromagnetic waves. This provides the additional beneficial effects that the direction of the outgoing (i.e., transmitted) waves is also in the direction of the base station and away from the user's body 1, thereby reducing the amount of power required to transmit and decreasing the amount of electromagnetic energy absorbed by the user's body 1.

Figure 3:
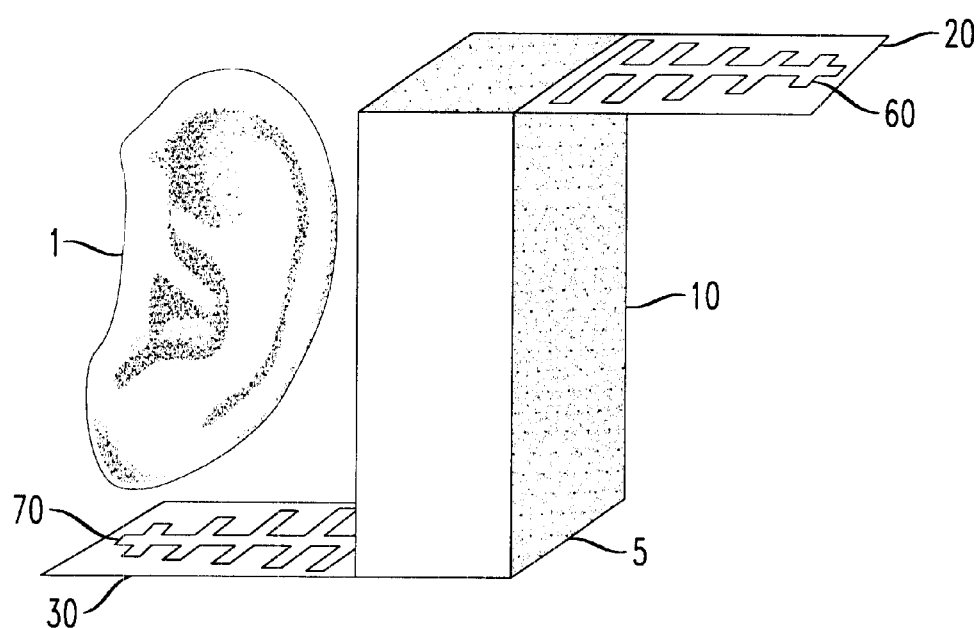
FIG. 3 represents a view of a third embodiment of a portable telephone with directional antennas positioned in both top and bottom flips of the portable telephone.

FIG. 3 shows a view of a third preferred embodiment of a portable telephone 5 with two flips, a top flip 20 and a bottom flip 30. Directional antennas 60 and 70 are positioned in the top flip 20 and the bottom flip 30, respectively, of the portable telephone 5.

The portable telephone 5 shown in FIG. 3 is shown with the top flip 20 and the bottom flip 30 positioned for use at approximately 90 degrees from the body 10 of the portable telephone 5. It should be noted that the top flip 20 and the bottom flip 30 may be positioned for use at any angle from the body 10 of the portable telephone 5. However, an angle between approximately 60 degrees to 120 degrees is preferred.

Ideally, the top flip 20 and the bottom flip 30 (hence, the directional antennas 60 and 70) are positioned for use such that the beams of the directional antennas are substantially parallel to the direction of the incoming electromagnetic waves. This provides the additional beneficial effects that the direction of the outgoing (i.e., transmitted) waves is also in the direction of the horizon and away from the user's body 1, thereby reducing the amount of power required to transmit and decreasing the amount of electromagnetic energy absorbed by the user's body 1.

The portable telephone 5 of FIG. 3 may include a two branch diversity receiver (not shown) with a branch corresponding to each of the directional antennas 60 and 70. This enables a diversity system to be used in the portable telephone 5 to reduce the effects of fading. In a diversity system, because the signal cancellations (fades) on the two antennas do not substantially coincide, fading that affects one antenna usually does not affect the other antenna, thereby providing protection against fading.

In FIG. 3, the two directional antennas 60 and 70 are positioned to provide directional diversity (i.e., their beams are positioned in substantially opposite directions). In addition, in FIG. 3, the two directional antennas 60 and 70 are positioned to provide space diversity (i.e., they are not co-located). It should be noted that the two directional antennas 60 and 70 can be positioned to provide directional diversity, space diversity or both.

Although the directional antennas 60 and 70 shown in FIGS. 1, 2 and 3 are log periodical directional antennas, any type of directional antenna (for example, tapered or flared slot) is suitable.

Thus, it is seen that a portable telephone including a directional antenna is provided in which the directional antenna is designed such that it can be positioned for use so that its. beam is substantially parallel to the direction of received electromagnetic energy (i.e., the horizon), thereby increasing the efficiency at which electromagnetic energy is transmitted to and received from the base station(s) as well as reducing the levels of electromagnetic energy transmitted into the body of the portable telephone user and providing increased protection against fading. One skilled in the art will appreciate that the present invention can be practiced by other than the described embodiments, which are presented for purposes of illustration and not of limitation, and the present invention is limited only by the claims which follow.

What is claimed is:

1. A portable telephone that communicates with a base station comprising:

a plurality of substantially flat directional antennas comprising a first directional antenna and a second directional antenna, wherein each substantially flat directional antenna in said plurality is located in a plane, has a beam that is substantially parallel to the plane, and transmits to said base station, wherein said portable telephone employs the plurality of substantially flat directional antennas to directionally and spatially diversify transmission to said base station.

2. The portable telephone of claim 1 wherein said first directional antenna and said second directional antenna are positioned to provide diversity.

3. The portable telephone of claim 2 wherein said first directional antenna and said second directional antenna are positioned to provide directional diversity.

4. The portable telephone of claim 2 wherein said first directional antenna and said second directional antenna are positioned to provide space diversity.

5. The portable telephone of claim 2 wherein said first directional antenna and said second directional antenna are positioned to provide directional diversity and space diversity.

6. The portable telephone of claim 1 further comprising:

a top flip positioned near the top of said portable telephone; and a bottom flip positioned near the bottom of said portable telephone wherein said first directional antenna and said second directional antenna are fabricated in said top flip and said bottom flip, respectively.

7. The portable telephone of any one of claims 1 through 6 wherein said first directional antenna and said second directional antenna are tapered slot directional antennas.

8. The portable telephone of any one of claims 1 through 6 wherein said first directional antenna and said second directional antenna are flared slot type directional antennas.

9. The portable telephone of any one of claims 1 through 6 wherein said first directional antenna and said second directional antenna are log-periodical directional antennas.

10. The portable telephone of any one of claims 1 through 6 wherein said first directional antenna and said second directional antenna each includes an array of radiating elements.

11. A system for mobile communication comprising:

a base station; and a portable telephone comprising a first directional antenna, wherein said first directional antenna is positioned for use such that the beam of said first directional antenna is substantially parallel to the direction of incoming waves from said base station, and a second directional antenna, wherein said second directional antenna is positioned for use such that the beam of said second directional antenna is substantially parallel to the direction of incoming waves from said base station, wherein both said first directional antenna and said second directional antenna transmit to said base station, and wherein said portable telephone employs said first directional antenna and said second directional antenna to directionally and spatially diversify transmission to said base station.

12. The system of claim 11 wherein said first directional antenna and said second-directional antenna are positioned on said portable telephone to provide diversity.

13. The system of claim 12 wherein said first directional antenna and said second directional antenna are positioned on said portable telephone to provide directional diversity.

14. The system of claim 12 wherein said first directional antenna and said second directional antenna are positioned to provide space diversity.

15. The system of claim 12 wherein said first directional antenna and said second directional antenna are positioned on said portable telephone to provide directional diversity and space diversity.

16. The system of claim 11 wherein said portable telephone further comprises:

a top flip positioned near the top of said portable telephone; and a bottom flip positioned near the bottom of said portable telephone wherein said first directional antenna and said second directional antenna are fabricated in said top flip and said bottom flip, respectively.

17. The system of claim 11 wherein said first directional antenna and said second directional antenna are tapered slot directional antennas.

18. The system of claim 11 wherein said first directional antenna and said second directional antenna are flared slot type directional antennas.

19. The system of claim 11 wherein said first directional antenna and said second directional antenna are log-periodical directional antennas.

20. The system of claim 11 wherein said first directional antenna and said second directional antenna each include an array of radiating elements.

* * * * *